(12) United States Patent
Whitson

(10) Patent No.: US 6,594,959 B2
(45) Date of Patent: Jul. 22, 2003

(54) MASONRY LAWN EDGING BLOCK ASSEMBLY

(75) Inventor: Robert L. Whitson, West Bend, WI (US)

(73) Assignee: Bend Industries, Inc., West Bend, WI (US)

( * ) Notice: Subject to any disclaimer, the term of this patent is extended or adjusted under 35 U.S.C. 154(b) by 0 days.

(21) Appl. No.: 09/968,604

(22) Filed: Sep. 30, 2001

(65) Prior Publication Data

US 2002/0078636 A1 Jun. 27, 2002

Related U.S. Application Data

(63) Continuation-in-part of application No. 29/147,573, filed on Sep. 1, 2001, and a continuation-in-part of application No. 29/134,640, filed on Dec. 22, 2000, now Pat. No. Des. 448,860.

(51) Int. Cl.$^7$ .............................................. E02D 27/00
(52) U.S. Cl. .......................... 52/102; 52/586.1; 52/565; 404/7
(58) Field of Search ............................... 52/102, 169.1, 52/169.2, 169.3, 586.1, 608, 562, 565; 47/33; 404/6, 7, 8

(56) References Cited

U.S. PATENT DOCUMENTS

| 1,922,462 A | * | 8/1933 | Tranchell ..................... 52/604 |
| 3,087,279 A | | 4/1963 | Thompson |
| 4,844,652 A | * | 7/1989 | Schroughan .................... 404/6 |
| 4,976,063 A | | 12/1990 | Young |
| 4,986,042 A | | 1/1991 | Richardt |
| 5,092,076 A | * | 3/1992 | Terreta ........................... 47/33 |
| D336,140 S | | 6/1993 | Lavery |
| 5,452,541 A | * | 9/1995 | DeMaio ......................... 47/33 |
| 6,233,897 B1 | * | 5/2001 | Jurik ............................ 52/604 |

FOREIGN PATENT DOCUMENTS

DE            2414674          10/1975

* cited by examiner

Primary Examiner—Carl D. Friedman
Assistant Examiner—Jennifer I. Thissell
(74) Attorney, Agent, or Firm—Ryan Kromholz & Manion, S.C.

(57) ABSTRACT

The present invention relates to a masonry lawn edging block assembly for a multi-grade landscape setting where the ground level of the lawn is lower than the adjacent areas. The assembly includes a plurality of like-shaped straight blocks, outside cornering blocks and like-shaped inside cornering blocks that create a border between the lawn and the adjacent area. The present invention has an L-shaped cross section that includes a vertically extending wall portion and a horizontally extending base portion. Dowels are used to connect adjacent blocks. A series of like-shaped blocks are connected in an end-to-end, end-to-side and end-to-rear arrangements to form the border. The base of each block includes a platform, and these platforms form a continuous deck upon which a conventional lawnmower can travel to cut the grass along the edging block assembly in an even manner and to the same desired height as the rest of the lawn.

10 Claims, 11 Drawing Sheets

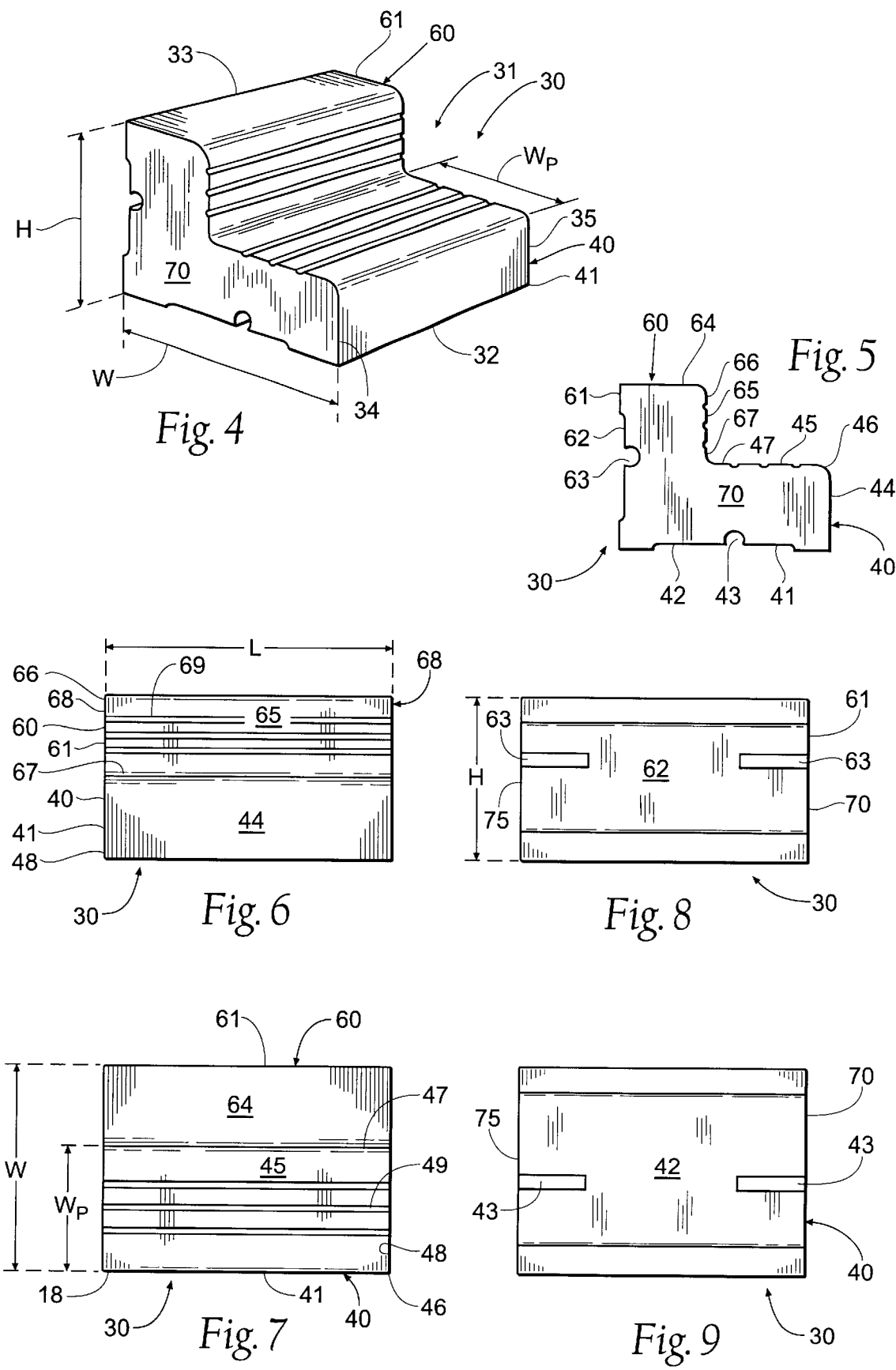

MASONRY LAWN EDGING BLOCK ASSEMBLY

This is a continuation-in-part of application Ser. No. 29/134,640 filed on Dec. 22, 2000 now U.S. Pat. No. D. 448,860, and a continuation-in-part of Ser. No. 29/147,573, filed on Sep. 1, 2001.

TECHNICAL FIELD OF THE INVENTION

This invention relates to a multi grade masonry lawn edging block assembly formed by a plurality of like-shaped straight blocks, like-shaped outside corner blocks and like-shaped inside corner blocks, the assembly forming a border between upper and lower grades of the multi-grade landscape setting, the lower grade defining the margins of a lawn that is easily mowed along the border by a conventional lawnmower.

BACKGROUND OF THE INVENTION

The landscaping of many homes and commercial properties combine a lawn area with any number of complimentary functional features and decorative amenities. Although the lawn provides an area for a wide variety of practical uses and recreational activities, by itself it can be considered rather boring in appearance. The lawn is also inappropriate or undesirable for some portions of a yard such as immediately in front of a door or in a high traffic areas where the grass would be trampled. Landscaping settings such as gardens, hedges, gravel or wood chip paths, trees etc. are used to compliment the natural beauty of the lawn. To achieve proper drainage or for other functional or aesthetic reasons, the areas adjacent the lawn are frequently elevated several inches above the ground level of the lawn. This creates a multi-grade landscape setting with a lower ground level for the lawn and a higher ground level for the adjacent areas. A variety of masonry blocks have been developed to form a border that separates the lawn from an adjacent raised area. The blocks are placed in a row to form a border between the lawn and the adjacent area. The blocks project above the ground level of the lawn in order to retain the higher ground level of the adjacent area.

A problem with conventional lawn edging blocks for a multi-grade application is that they create an obstacle when mowing the lawn. The lawn typically grows right up to the edge of the blocks, and the blocks typically extend several inches above the ground level of the lawn. Yet, the lawn is typically cut to a height lower than the top of the edging blocks. As a result, conventional lawnmowers have a difficult time cutting the grass growing along the edge of the blocks. The mowers cannot cut the grass immediately adjacent the blocks, particularly to a level matching the reset of the lawn. When the wheels of the mower are pushed over the blocks, the grass is too long near the blocks. A worker may try to tip the lawnmower to get the mower blade to cut near the edging blocks. The worker can also trip or slip and fall in an effort to negotiate mowing around the blocks. This type of maneuvering can be frustrating, increase the time needed to mow the lawn, and lead to an unnecessary injury. In addition, the mower blade can inadvertently strike the blocks and damage the mower blade and the blocks.

Many conventional multi-grade edging blocks are best suited for trimming by additional lawn edging tools or implements. Unfortunately, this edging equipment is expensive and increases the time needed to maintain the lawn in an attractive appearance. These implements are frequently unable to trim the lawn to the desired height. Some areas are trimmed too close to the ground, which can hurt or kill the lawn. Other areas are trimmed too long, which obscures the view of the block border and creates an unkept appearance.

Another problem with conventional lawn edging block designs is that they do not produce a continuous and uniform border having a professional looking and attractive appearance. Discontinuities appear in the border. Blocks that abut each other do not produce a continuous flow in geometry or design. As a result, the lawn edging block assembly has an unpolished appearance. In addition, adjacent blocks are not connected. The blocks are simply placed next to one another to form the border assembly. Gaps are left between adjacent blocks when they are set in place or can form over time when the blocks settle. There is no easy mechanism to align the blocks into a straight and vertically even row.

A further problem with conventional multi-grade lawn edging block designs is that they the blocks have a set height. Each block is only capable of accommodate one grade elevation. The homeowner must buy different blocks for different landscape settings. The homeowner must know how many blocks are needed for each application, and store replacement blocks of each size block they use. If the homeowner simply digs a deeper trench for some of edging block borders, they will have to buy blocks that are larger and more expensive than they need for many applications. They will also spend more time constructing the border.

A still further problem with multi-grade lawn edging block designs is that a limited number of block types should be able to form a wide variety of border configurations. The limited number of block types should be able to form border configurations having straight sections, inside or concave corners and outside or convex corners. The more adaptable the block types are to form a variety of border configurations the more adaptable the blocks will be to fit into the unique landscape settings found in residential and commercial settings. Yet, producing several different block types requires additional manufacturing mold, set up and inventory costs. Additional costs are also incurred during shipping and by the distributors and retailers that have to carry inventory for all the types of blocks the customers will require. Accordingly, a block assembly should require as few different types of blocks as possible.

The present invention is intended to solve these and other problems.

BRIEF DESCRIPTION OF THE INVENTION

The present invention relates to a masonry lawn edging block assembly for a multi-grade landscape setting where the ground level of the lawn is lower than the adjacent areas. The assembly includes a plurality of like-shaped straight blocks, outside cornering blocks and like-shaped inside cornering blocks that create a border between the lawn and the adjacent area. The present invention has an L-shaped cross section that includes a vertically extending wall portion and a horizontally extending base portion. Dowels are used to connect adjacent blocks. A series of like-shaped blocks are connected in an end-to-end, end-to-side and end-to-rear arrangements to form the border. The base of each block includes a platform, and these platforms form a continuous deck upon which a conventional lawnmower can travel to cut the grass along the edging block assembly in an even manner and to the same desired height as the rest of the lawn.

One advantage of the present masonry lawn edging block assembly is that its blocks allow conventional lawnmowers to easily cut the grass immediately adjacent the blocks. The lawnmower wheels travel across the platform of each block and deck of the assembly in a smooth and even manner. The width of the platform and deck allows the lawnmower blade to pass over and cut the grass immediately adjacent the edging blocks. The worker does not need to tip or otherwise manipulate the lawnmower in an awkward manner to cut the grass near the edging blocks. Additional lawn-trimming tools and implements are not needed. The grass along the edging blocks is also cut in an even manner to the same desired height as the rest of the lawn. This gives the edging blocks a consistent professionally groomed appearance. Mowing time is minimized because the lawn immediately adjacent the blocks is cut with one pass of a conventional lawnmower.

Another advantage of the present lawn edging block assembly is that it produces a continuous and uniform border having an attractive appearance. Each block has a similar L-shaped cross section so that they can be easily aligned in a flush manner, so that the entire assembly has a continuous and uniform geometric appearance. Adjacent blocks easily connected by a pair of flexible dowels. These connections interlock the adjacent blocks and increase the strength and rigidity of the pattern of edging blocks. The dowels allow for some movement of the blocks to help avoid cracks in the blocks due to freezing and thawing or the weight of a person walking on the blocks. The dowels also help prevent gaps from forming between adjacent blocks when they are set in place and over time as the blocks settle. The dowels are easily inserted into the openings in the ends of the block to form a straight and vertically even border with an attractive appearance.

A further advantage of the present multi-grade lawn edging block assembly is that the blocks have a simple L-shaped cross section that allows a single block to be used for two different grade elevations. The base and wall form two perpendicular projections. One projection extends vertically upwards and the other extends horizontally outwards in a plane generally parallel with the ground level of the lawn area. The block is reversible because, these projections are not the same height or width. The landscaper chooses which portion to extend upwards and which to extend outwards along the ground. The block is taller when one projection is aligned vertically and shorter when the other projection is aligned vertically. Fewer replacement blocks need to be purchased and stored.

A still further advantage of the present multi-grade lawn edging block assembly is that only a limited number of block types are able to form a wide variety of border configurations. The complete set of block types includes a single straight block, a single inside corner block and single outside corner block. These three blocks can be combined to form a wide variety of border configurations. This limited number of block types can form border configurations having straight sections, inside or concave corners and outside or convex corners. Many configurations can be made using only the straight blocks and one of type of the corner blocks. In fact, the corner blocks are not needed if a homeowner or a landscape crew has an appropriate mitering saw to cut 45 degree angles into the straight blocks. The block assembly can form a variety of border configurations and can fit into the unique landscape settings of found in house and commercial settings. Manufacturing costs are reduced because mold, set up and inventory costs are only incurred for one, two or three different types of blocks. Shipping, distribution and retail savings are also achieved by limiting the types of blocks needed to construct a wide variety of border configurations.

Other aspects and advantages of the invention will become apparent upon making reference to the specification, claims and drawings.

BRIEF DESCRIPTION OF THE DRAWINGS

FIG. 4 is perspective view of a straight block for forming straight segments in the present multi-grade lawn edging block assembly.

FIG. 5 is an end view of the straight block showing its L-shaped profile.

FIG. 6 is a front view of the straight block.

FIG. 7 is a top view of the straight block.

FIG. 8 is a rear view of the straight block.

FIG. 9 is a bottom view of the straight block.

DESCRIPTION OF THE PREFERRED EMBODIMENT

While this invention is susceptible of embodiment in many different forms, the drawings show and the specification describes in detail the preferred embodiments of the block invention. It should be understood that the drawings and specification are to be considered an exemplification of the principles of the invention. They are not intended to limit the broad aspects of the invention to the embodiments illustrated.

The landscaping of households and commercial properties frequently include a multi-grade landscape setting 5 with an area 6 for a lawn 7. The lawn area 6 has a specific ground elevation $E_1$. The landscape setting 5 also typically includes areas 8 for walkways, gardens, hedges, and trees or shrubs. These areas 8 are frequently raised to a ground elevation $E_2$ above the lawn ground level $E_1$. The difference between the ground elevations $E_1$ and $E_2$ can be several inches in height. These raised areas 8 are raised for drainage purposes or to visually accentuate the area. The lawn 7 is typically maintained at a height below the raised ground elevation $E_2$.

Figure 1:
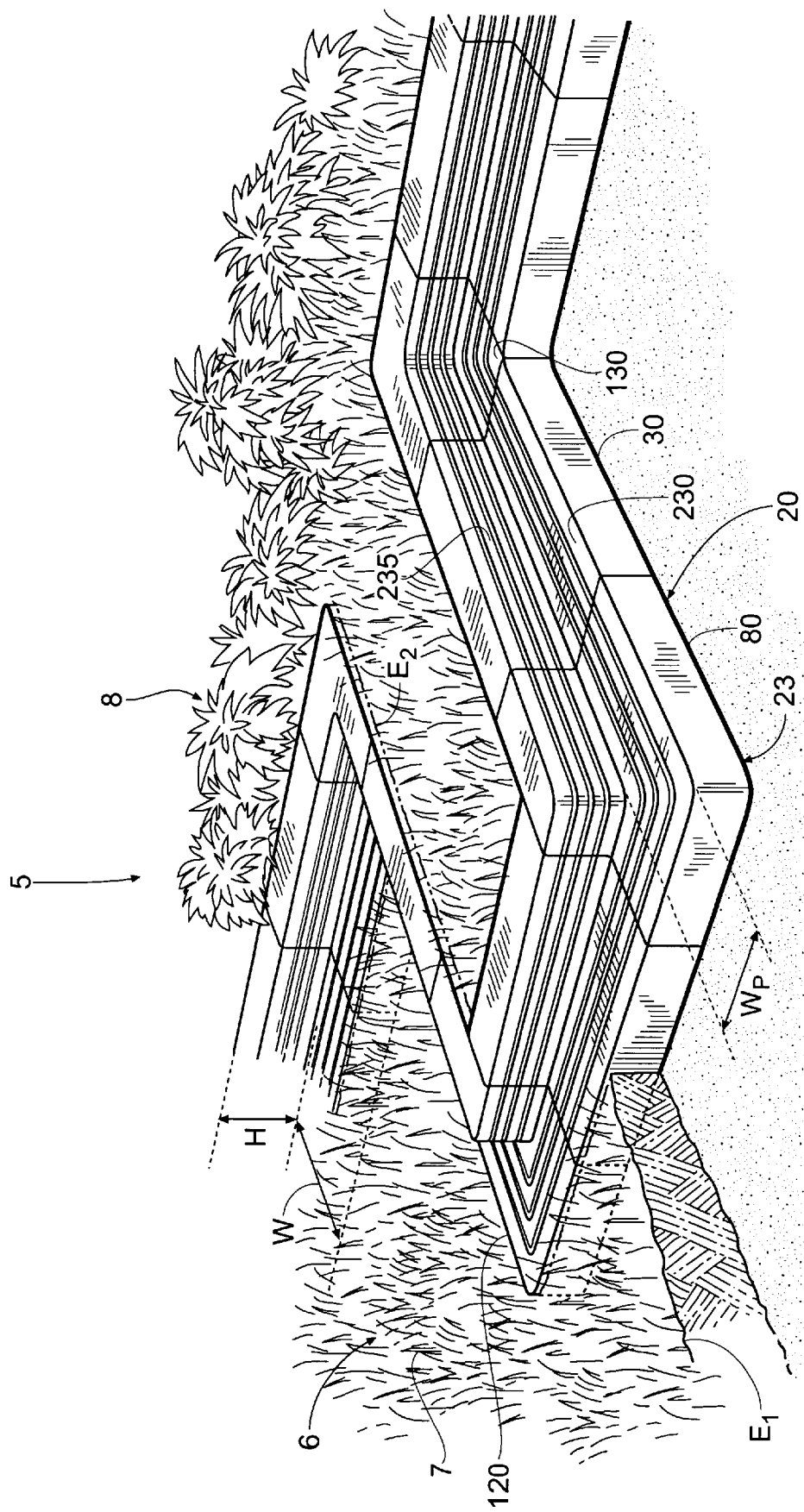
FIG. 1 is a perspective view of a multi-grade lawn edging block assembly formed by straight blocks, outside corner blocks and inside corner blocks.
Figure 2A:
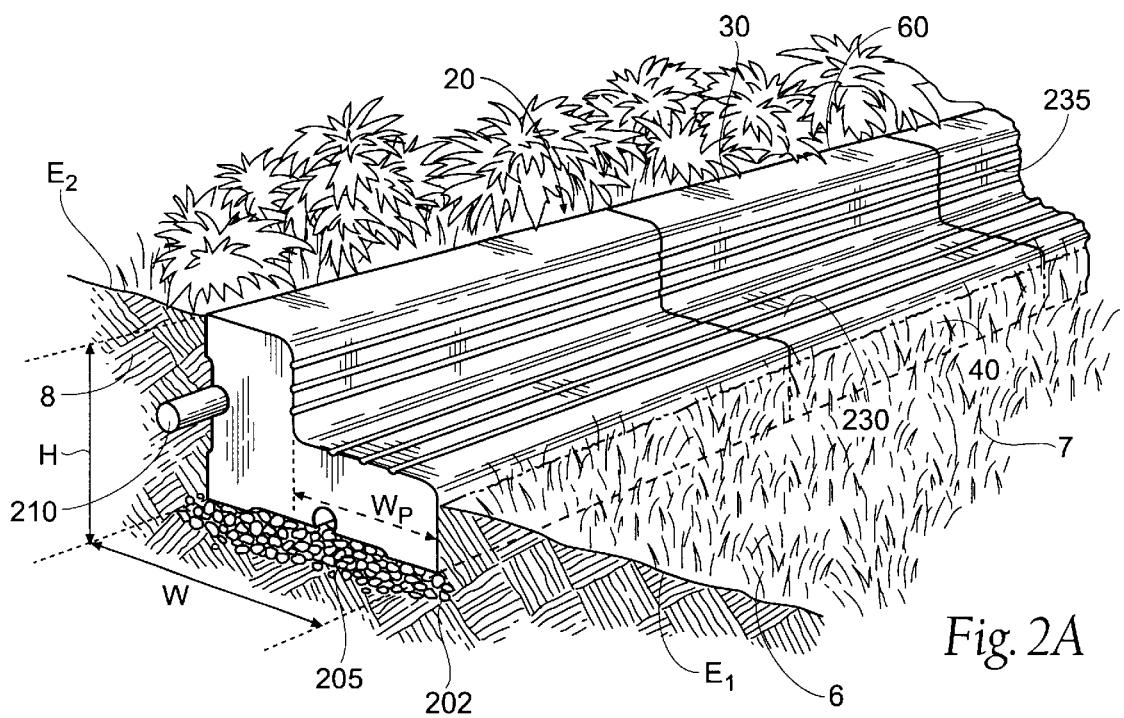
FIG. 2a is a perspective view of a straight segment of edging blocks showing the short flange extending upwards and the long flange resting on the soil.
Figure 2B:
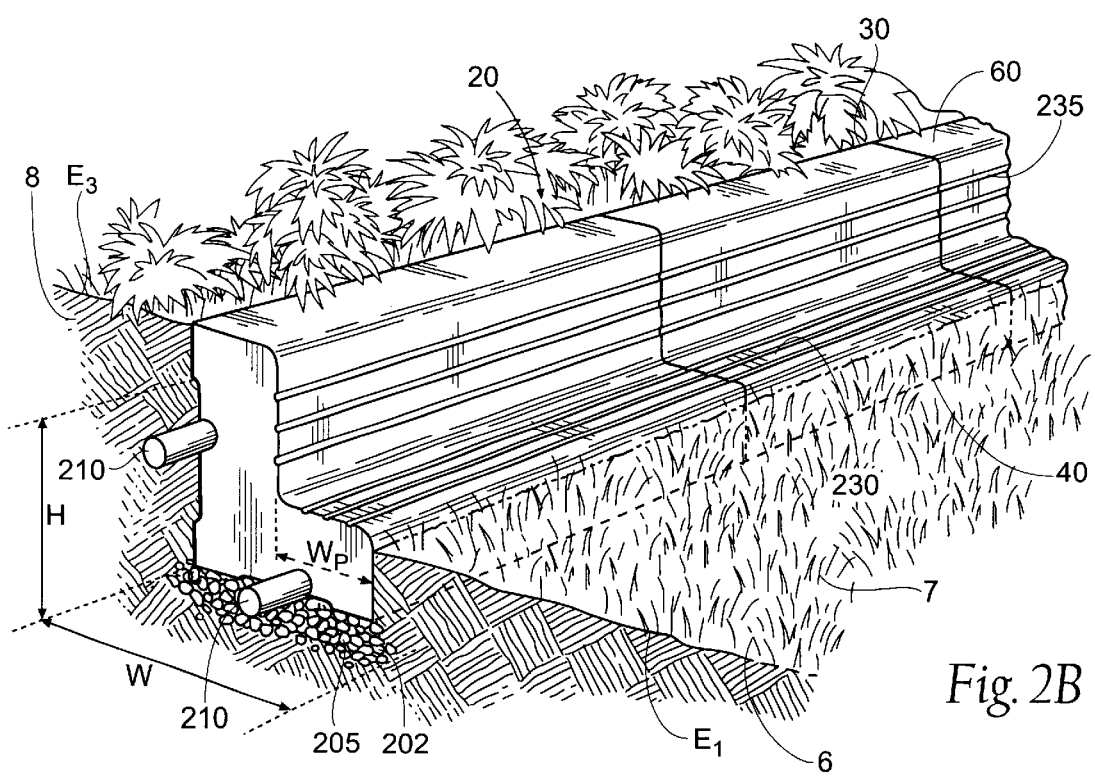
FIG. 2b is a perspective view of the straight segment of edging blocks showing the long flange extending upwards and the short flange resting on the soil.
Figure 3A:
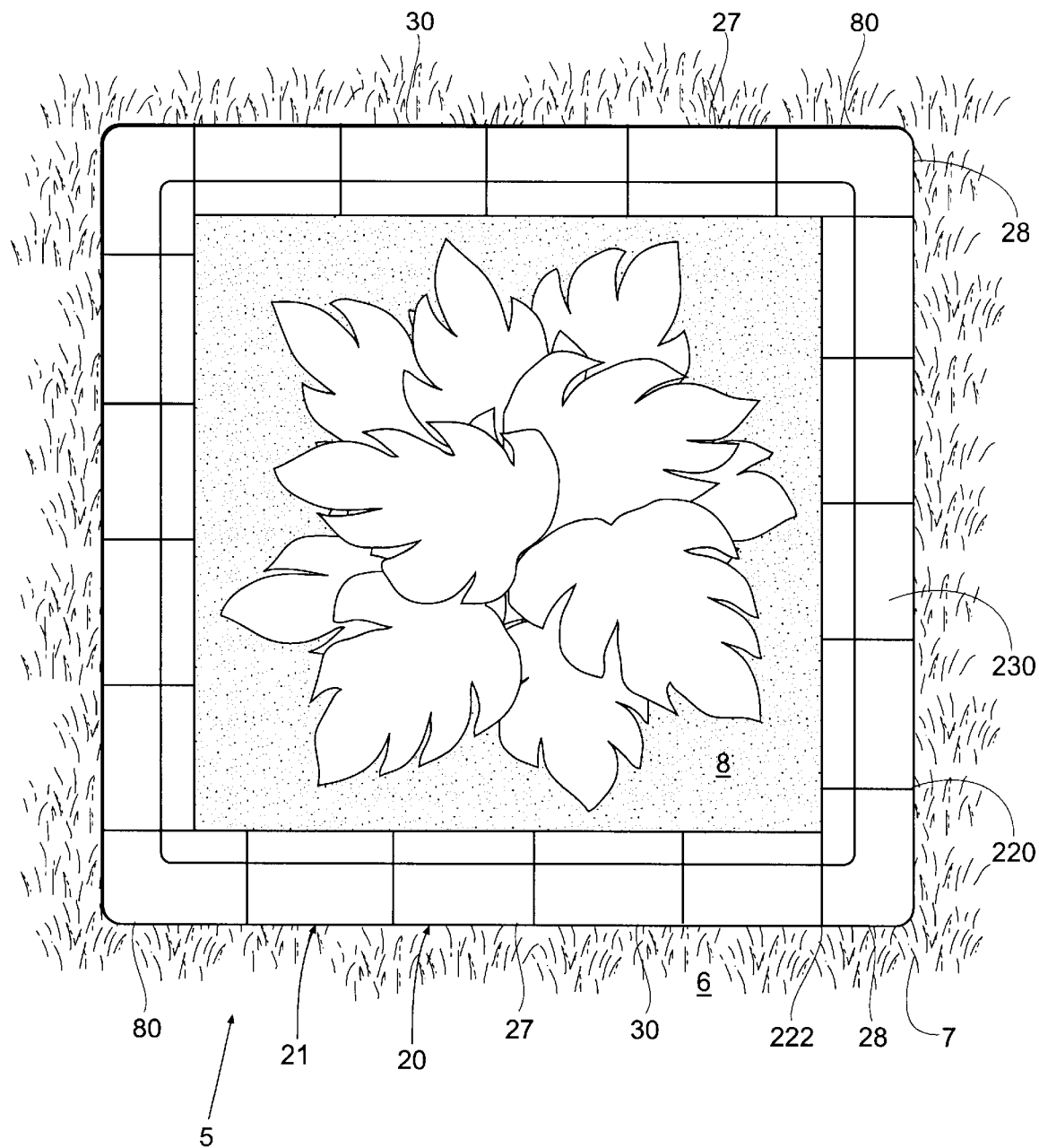
FIG. 3a is a plan view of a masonry lawn edging block assembly formed from several like-shaped straight blocks and several like-shaped outside corner blocks to form a square border configuration around a plant such as a bush or tree.
Figure 3B:
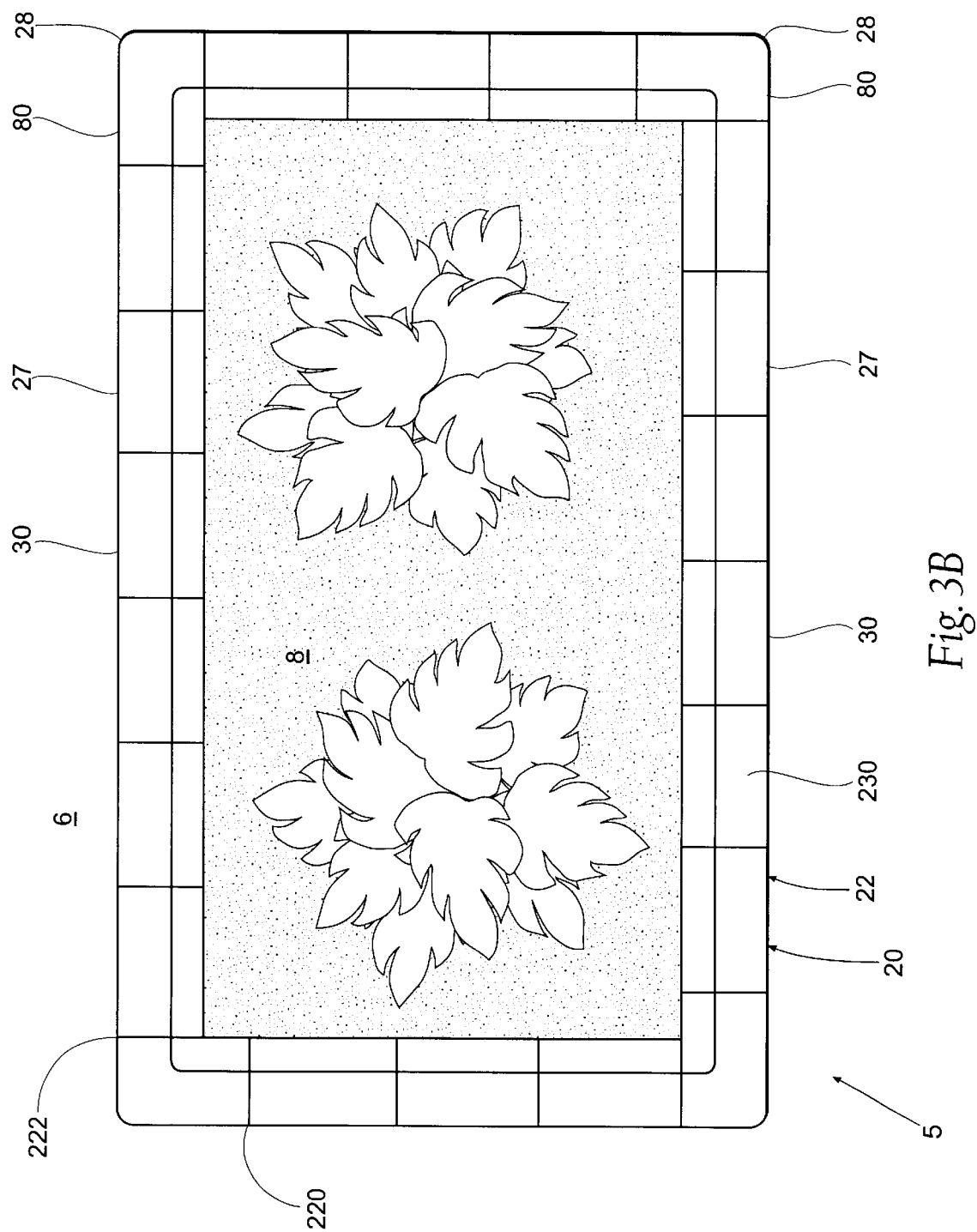
FIG. 3b is a plan view of a masonry lawn edging block assembly formed from several like-shaped straight blocks and several like-shaped outside corner blocks to form a rectangular border configuration around a group of bushes or trees.
Figure 3C:
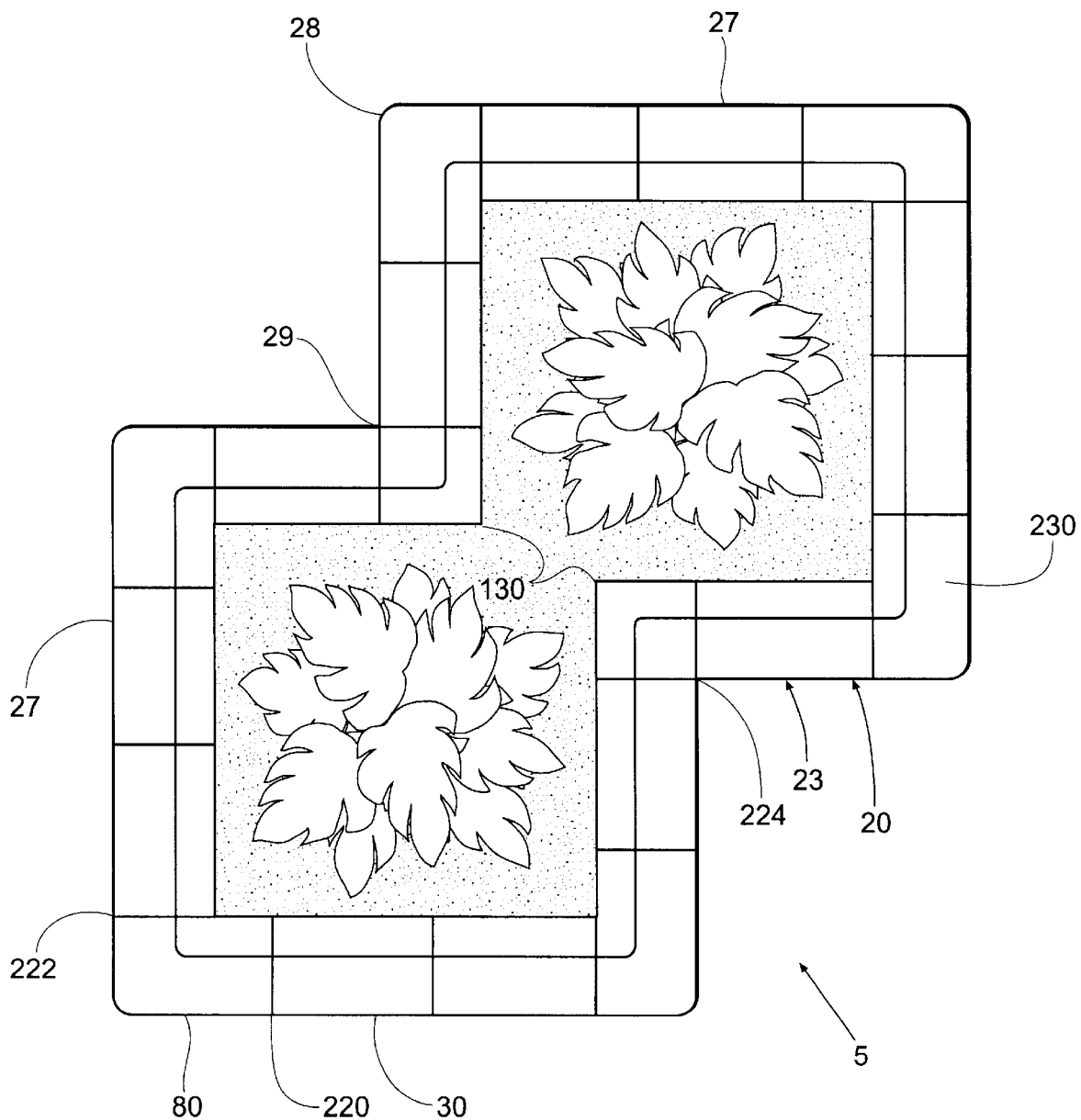
FIG. 3c is a plan view of a masonry lawn edging block assembly formed from several like-shaped straight blocks, several like-shaped right and left hand outside corner blocks and a number of like-shaped inside cornering blocks to form a unique border configuration around a group of bushes or trees.
Figure 3D:
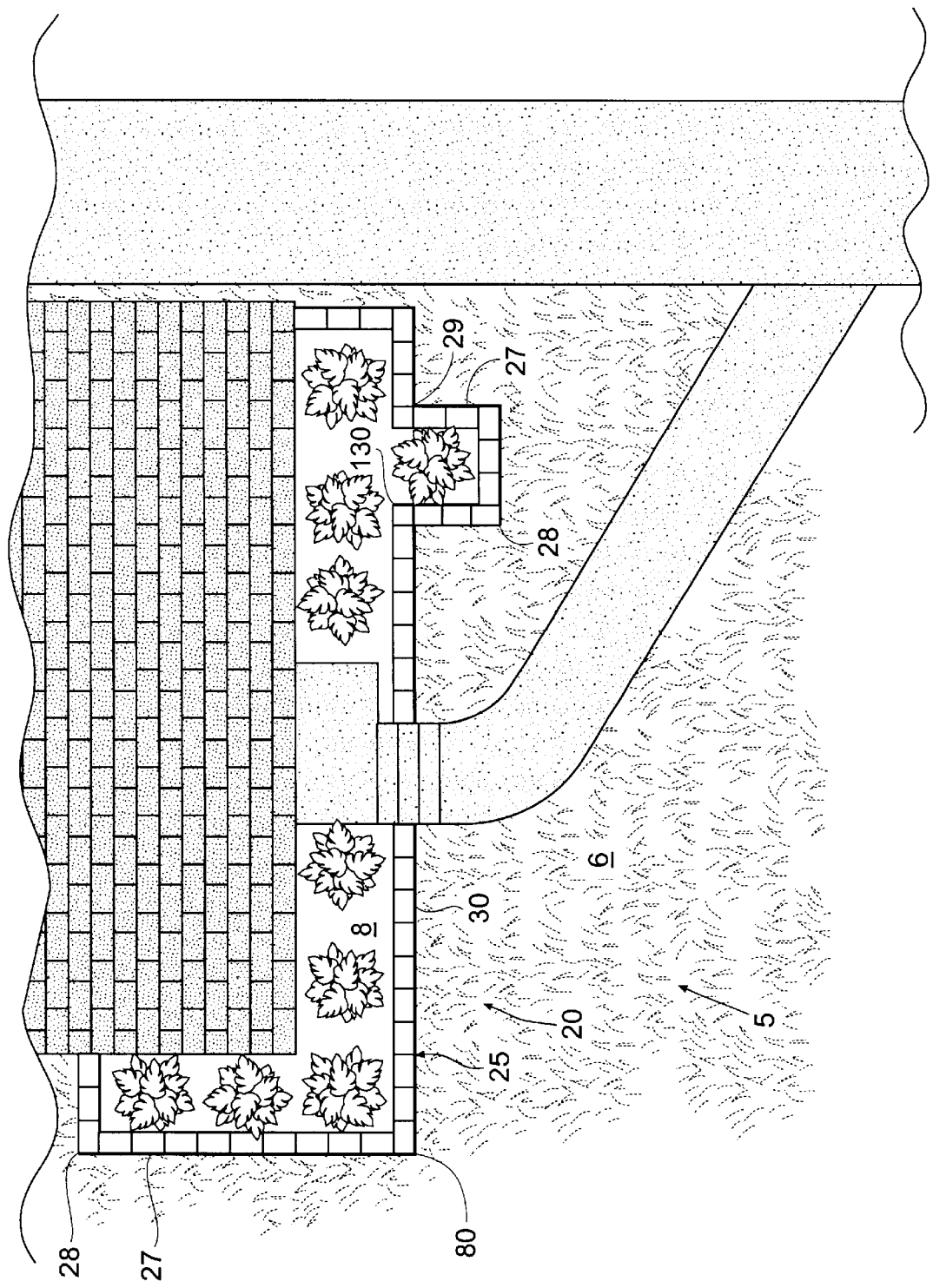
FIG. 3d is a plan view of a masonry lawn edging block assembly formed from several like-shaped straight blocks, several like-shaped right and left hand outside corner blocks and a number of like-shaped inside cornering blocks to form a unique border configuration around the landscaping in front of a house or building.
Figure 10:
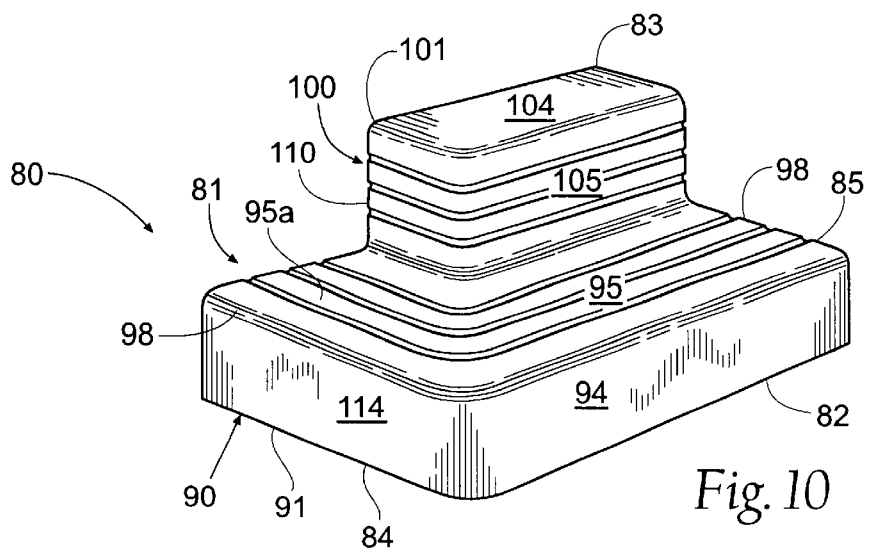
FIG. 10 is a perspective view of an outside corner block for forming an outside corner in the present multi-grade lawn edging block assembly.
Figures 11, 12:
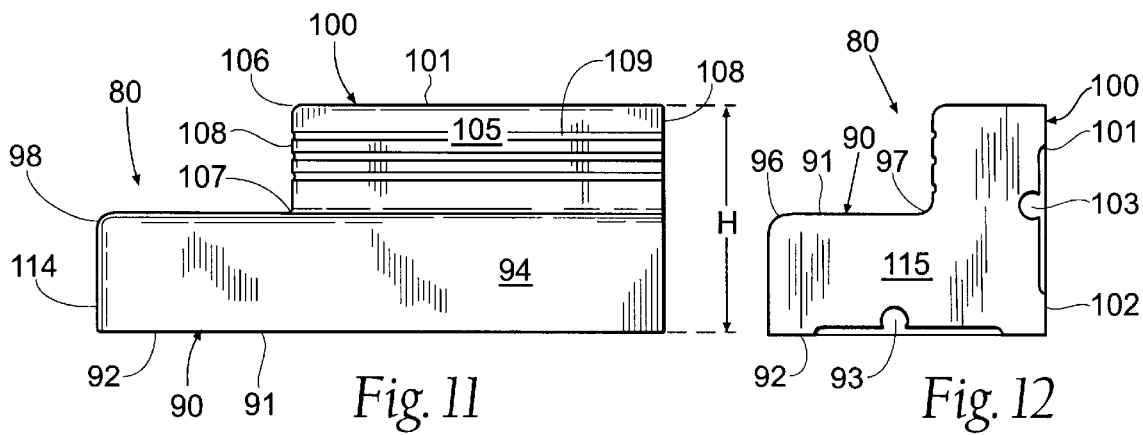
FIG. 11 is a front view of the outside corner block.
FIG. 12 is an end view of the outside corner block.
Figure 13:
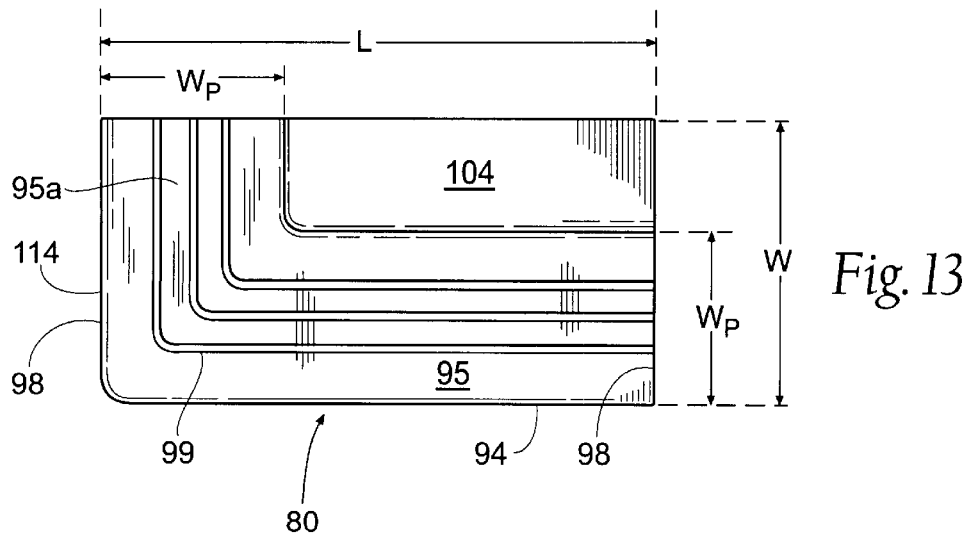
FIG. 13 is top view of the outside corner block.
Figures 14, 15:
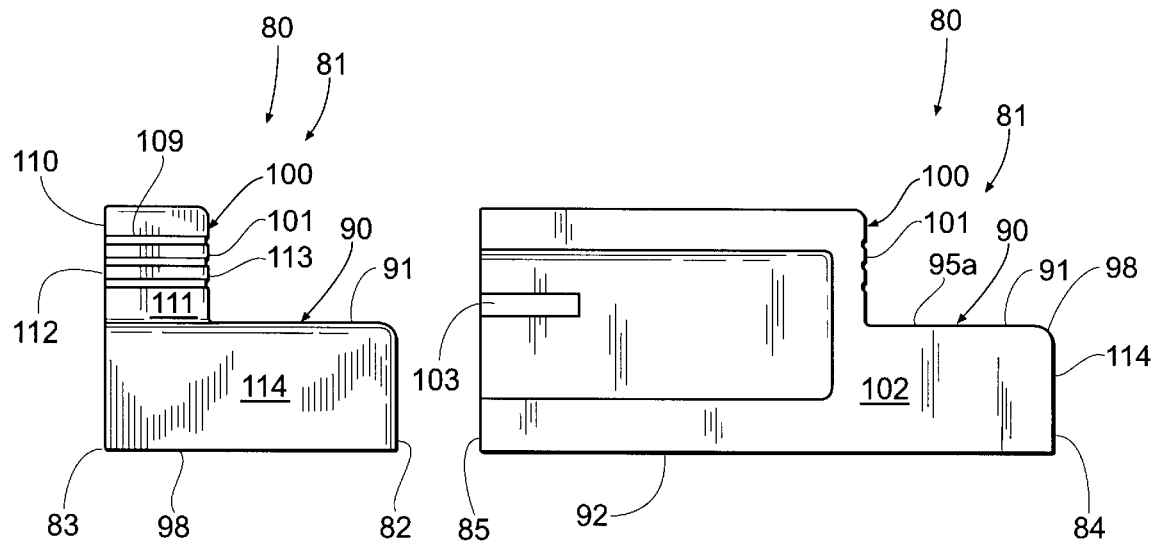
FIG. 14 is an end view of the outside corner block.
FIG. 15 is a rear view showing outside corner block.
Figure 16:
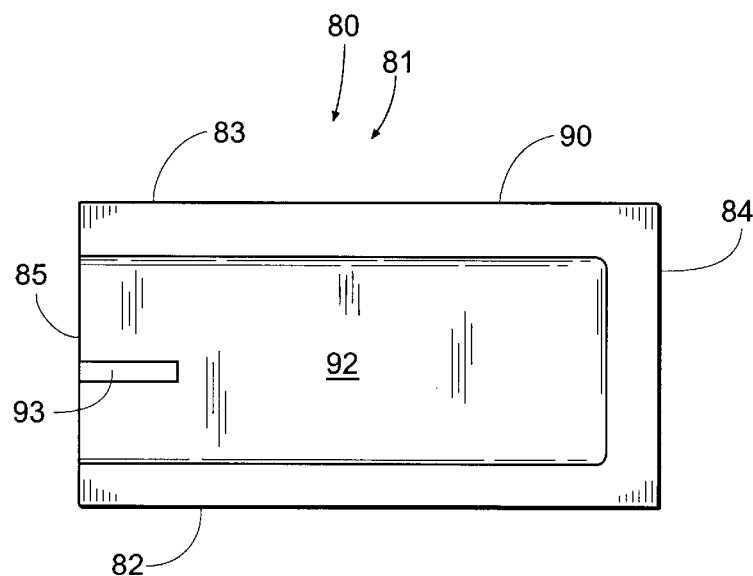
FIG. 16 is a bottom view of the outside corner block.

The present multi-grade masonry lawn edging block assembly is generally shown in FIGS. 1, 2a and 2b and indicated by reference number 20. The lawn edging block assembly 20 forms a mowable border having a specific configuration. The configuration can take on almost any shape containing straight segments 27, outside corners 28 and inside corners 29. The border 20 can form closed geometric shapes, such as a square 21, rectangle 22, or multi-sided shape 23 as shown in FIGS. 3a–c, or can form a configuration with two ends 25 as shown in FIG. 3d. When assembled, the border 20 has a continuous and uniform appearance throughout its length regardless of the shape of the border. The border configuration 20 is formed by straight blocks 30 and one or both types of cornering blocks 80 and 130.

Each of the straight blocks 30 has the shape shown in FIGS. 4–9. Each straight block 30 is preferable made of masonry or concrete, and weighs about five pounds. Each block 30 has a main body 31 with a front end 32 and an opposed rear end 33. The distance between the forward most portion of the front end 32 and the rear end 33 defines the width W of the block 30, which is preferably about four and a half (4½) inches. The block 30 has first and second opposed longitudinal side ends 34 and 35. The distance between the side ends 34 and 35 defines the length L of the block 30, which is preferably about eight (8) inches. The block 30 has an upper end and an opposed lower end. The distance between the upper most portion of the upper end and the lower end defines the height H of the block 30, which is preferably about three and a half (½) inches.

The straight block 30 has a base 40 with an outwardly extending portion 41 that extends from one end 34 of the block 30 to the other 35. The outwardly extending portion 41 has a bottom surface 42, a front surface 44 and an upper surface or platform 45. The bottom surface 42 is generally planar and rectangular in shape, and has front, rear and opposed side edges that define its outer margins or the footprint of the block 30. The front and rear edges are substantially parallel. The opposed edges are substantially parallel, and substantially perpendicular to the front and rear edges. The bottom surface 42 is substantially flat, but includes a pair of ledges or ridges proximal to and traversing the front and rear edges that extend slightly down about ⅛ inch from the major portion of the bottom surface. The ledges define a channel that traverses the length of the bottom surface 42. Each ledge is about ¾ inch wide and forms a step or abutment along its intersection with the channel. One hole or opening 43 is formed into the bottom surface 42 proximal each of its side edges. Each opening is adapted to receive a portion of a cylindrical shaped dowel as discussed below. The dowel openings 43 are preferably quasi-circular or horseshoe shaped with a diameter adapted to snuggly and securely receive a corresponding dowel. The two dowel openings 43 are co-linear and parallel to the length of the base 40.

The front surface 44 of the base 40 is generally planar and rectangular in shape. The front surface 44 has upper, lower and opposed side edges. The side edges are substantially parallel. The upper and lower edges are also substantially parallel, and substantially perpendicular to the side edges. The front surface 44 forms the front most portion or front end 32 of the block 30. The front surface 44 is generally vertically oriented when the block is set in place, and perpendicular to the bottom surface 42. The lower edge of the front surface 44 intersects the front edge of the bottom surface 42 to form a lower front corner of the block 30.

The upwardly facing platform 45 of the base 40 is generally planar and rectangular in shape. The platform 45 has a rounded front and rear ends 46 and 47, and opposed side edges 48. The front end 46 is substantially parallel to and spaced from the rear end 47 a distance or platform width $W_p$ of about two and three quarters (2¾) inches. The side edges 48 are parallel, and perpendicular to the rounded front and rear ends 46 and 47. Three parallel grooves 49 extend the length of the platform 45 from one side edge 48 to the other. The grooves 49 are evenly and uniformly space apart to provide an ornamental aspect to the block. The grooves 49 also facilitate drainage and provide additional traction when the blocks are wet and covered with freshly cut grass, fallen leaves or other debris. The platform 45 is generally parallel to and spaced from the bottom surface 42 a distance or thickness of about one and three quarters (1¾) inches, and is perpendicular to the front surface. The front end 46 of the platform intersects the upper end of the front surface 44. This intersection is preferably beveled or rounded.

The wall 60 of the block 30 has an upwardly extending portion 61 that extends from one end 34 of the block 30 to the other 35. The upwardly extending portion has a rearward surface 62, a top surface 64 and a forward surface 65. The rearward surface 62 is generally planar and rectangular in shape, and has upper and lower edges and opposed side edges that define its outer margins or the rear face of the block 30. The side edges are substantially parallel. The upper and lower edges are substantially parallel, and perpendicular to the side edges. The rearward surface 62 is substantially flat, but includes a pair of ledges or ridges proximal to and traversing the front and rear edges that extend slightly down about ⅛ inch from the major portion of the bottom surface. Each ledge is about ¾ inch wide and forms a step or abutment in the rearward surface 62. One hole or opening 63 is formed into the rearward surface 62 proximal each of its side edges. Each opening is adapted to receive a portion of a cylindrical shaped dowel as discussed below. The dowel openings 63 are preferably quasi-circular or horseshoe shaped with a diameter adapted to snuggly and securely receive a corresponding dowel. The dowel openings 63 are co-linear and parallel to the length of the wall 60. The lower edge of the rearward surface 62 intersects the rear end of the bottom surface 42 to form the lower rear corner of the block 30. Although the wall 60 is generally shown and described as extending in a perpendicular manner relative to the base 40, it should be understood that the wall 60 could be angled out of this generally vertical orientation without departing from the broad aspects of the invention.

The top surface 64 of the upwardly extending portion 61 of the wall 60 has a front end, a rear edge, opposed side edges. The side edges are substantially parallel. The front end and rear edge are substantially parallel, and substantially perpendicular to the side edges. The top surface 64 is preferably generally perpendicular to the rearward surface 62, and preferably generally parallel to the bottom surface 42 and the platform 45 of the base 40. The rear edge intersects the upper edge of the rearward surface 62 to form the upper rear corner of the block 30.

The forward surface 65 of the wall 60 is generally planar and rectangular in shape, and has a top end 66, a bottom end 67, a first side end and a second side ends 68 that defining its outer margins or the front face of the block 30. The top and bottom ends 66 and 67 are parallel. The side edges 68 are parallel, and perpendicular to the top and bottom ends 66 and 67. Three parallel grooves 69 extend the length of the forward surface 65 from one side edge 68 to the other. The grooves 69 are evenly and uniformly space apart to provide an ornamental aspect to the block. The forward surface 65 is parallel to and spaced from the rearward surface 62 a distance or wall thickness of about one and three-quarters (1¾) inches. The top end 66 intersects the front end of the top surface 64. This intersection is preferably beveled or rounded. The bottom end 67 intersects the rear end 47 of the platform 45. This intersection is also preferably beveled or rounded. The distance between the top end 66 and bottom end 67 defines the height of the front surface, which is preferably about one and three-quarters (1¾) inches.

The side ends 34 and 35 of the block 30 have generally planar and L-shaped surfaces 70 and 75, respectively. Each end surface 70 and 75 has opposed upper and lower edges, and opposed front and rear edges that define the outer margins or one side face of the block 30. The end surfaces 70 and 75 are substantially parallel. The front and rear ends are substantially parallel, and substantially perpendicular to the upper and lower ends. Each end surface 70 and 75 is generally perpendicular to the rearward and forward surfaces 62 and 65 of the wall 60, as well as the bottom and front surfaces 42 and 44 of the base 40. The dowel holes 43 and 63 extend to and form an opening in the end surfaces 70 and 75 of the block 30. Forward surface 65 is perpendicular to each of the end surface 70 and 75, and the top surface 64. One side edge 68 of the front surface 65 of the wall 60 intersects an intermediate vertical edge of the first side surface 70 or 75.

The outside corner blocks 80 have a shape shown in FIGS. 10–16. Each corner block 80 is preferable made of masonry or concrete, and weighs about five pounds. Each block 80 has a main body 81 with a front end 82 and an opposed rear end 83. The distance between the forward most portion of the front end 82 and the rear end 83 defines the width W of the block 80, which is preferably about four and a half (4½) inches. The block 80 has first and second opposed longitudinal side ends 84 and 85. The distance between the side ends 84 and 85 defines the length L of the block 80, which is preferably about eight (8) inches. The block 80 has an upper end and an opposed lower end. The distance between the upper most portion of the upper end and the lower end defines the height H of the block 80, which is preferably about three and a half (3½) inches.

The corner block 80 has a base 90 with an outwardly extending portion 91 that extends from one end 34 of the block 30 to the other 35. The outwardly extending portion 91 has a bottom surface 92, a front surface 94 and an upper surface or platform 95. The bottom surface 92 is generally planar and rectangular in shape, and has front, rear and opposed side edges that define its outer margins or the footprint of the block 80, which is substantially the same as the footprint of block 30. The front and rear edges are substantially parallel. The opposed edges are substantially parallel, and substantially perpendicular to the front and rear edges. The bottom surface 92 is substantially flat, but includes a pair of ledges or ridges proximal to and traversing the front and rear edges that extend slightly down about ⅛ inch from the major portion of the bottom surface. The ledges define a channel that traverses the length of the bottom surface 92. One side of the bottom surface also has a ledge spanning between the front and rear ends. Each ledge is about ¾ inch wide and forms a step or abutment along its intersection with the channel. One hole or opening 93 is formed into the bottom surface 92 proximal one side edge. The opening is adapted to receive a portion of a cylindrical shaped dowel as discussed below. The dowel openings 93 are preferably quasi-circular or horseshoe shaped with a diameter adapted to snuggly and securely receive the dowel. The dowel opening 93 is parallel to the length of the base 90.

The front surface 94 of the base 90 is generally planar and rectangular in shape. The front surface 94 has an upper end, a lower edge, one side edge and one side end. The upper and lower ends of the front surface are separated by a base thickness of about 1 and three quarters (1¾) inch. The side edge and end are substantially parallel. The upper end and lower edge are also substantially parallel, and substantially perpendicular to the side edge and side end. The front surface 94 forms the front most portion or front end 82 of the block 80. The front surface 94 is generally vertically oriented when the block is set in place, and perpendicular to the bottom surface 92. The lower edge of the front surface 94 intersects the front edge of the bottom surface 92 to form a lower front corner of the block 80.

The upwardly facing platform 95 of the base 90 is generally planar. The platform 95 includes a side portion 95a that extends to the rear end 97 of the block 80 so that the platform forms a generally L-shaped surface. The platform 95 has a rounded front and rear ends 96 and 97, and a side edge and side end 98. The front end 96 is substantially parallel to and spaced from the rear end 97 a distance or platform width $W_p$ of about two and three quarters (2¾) inches. The side edge and side end 98 are parallel, and perpendicular to the rounded front and rear ends 96 and 97. Three parallel grooves 99 extend the length of the platform 95 from one side edge 98 to an intermediate location, at which point they take a ninety degree turn toward the rear end 83 of the block 80. The grooves 99 are evenly and uniformly space apart to provide an ornamental aspect to the block. The grooves 99 also facilitate drainage and provide additional traction. The platform 95 is generally parallel to the bottom surface 92, and perpendicular to the front surface 94. The front end 96 of the platform intersects the upper end of the front surface 94. This intersection is preferably beveled or rounded.

The wall 100 of the block 80 has an upwardly extending portion 101 that extends from one end 35 of the block 30 to a terminal end 110. The upwardly extending portion 101 has a rearward surface 102, a top surface 104 and a forward surface 105. The rearward surface 102 is generally planar, and has upper and lower edges and opposed side edges that define its outer margins or the rear face of the block 80. The side edges are substantially parallel. The upper and lower edges are substantially parallel, and perpendicular to the side edges. The rearward surface 102 is substantially flat, but includes a pair of ledges or ridges proximal to and traversing the upper and lower edges that extend slightly down about ⅛ inch from the major portion of the bottom surface. Each ledge is about ¾ inch wide and forms a step or abutment in the rearward surface 102. One hole or opening 103 is formed into the rearward surface 102 proximal one side edge. The opening is adapted to receive a portion of a cylindrical shaped dowel as discussed below. The dowel opening 103 is preferably quasi-circular or horseshoe shaped with a diameter adapted to snuggly and securely receive the dowel. The dowel opening 103 is parallel to the length of the wall 100. The lower edge of the rearward surface 102 intersects the rear end of the bottom surface 92 to form the lower rear corner of the block 80.

The top surface 104 of the upwardly extending portion 101 of the wall 100 has a side edge, a side end, a front end and a rear edge. The side edge and side end are substantially parallel. The front end and rear edge are substantially parallel and substantially perpendicular to the side edge and side end. The top surface 104 is preferably generally perpendicular to the rearward surface 102, and preferably generally parallel to the bottom surface 92 and the platform 95 of the base 90. The rear end intersects the upper end of the rearward surface 102 to form the upper rear corner of the block 80.

The forward surface 105 of the wall 100 is generally planar and rectangular in shape, and has a top end 106, a bottom end 107, a side edge and side end 108 that defining its outer margins or the front face of the block 80. The top and bottom ends 106 and 107 are parallel. The side edge and side end 108 are parallel, and perpendicular to the top and bottom ends 106 and 107. Three parallel grooves 109 extend the length of the forward surface 105 from the side edge to the side end 108. The grooves 109 are evenly and uniformly space apart to provide an ornamental aspect to the block. The forward surface 105 is parallel to and spaced from the rearward surface 102 a distance or wall thickness of about one and three-quarters (1¾) inches. The top end 106 intersects the front end of the top surface 104. This intersection is preferably beveled or rounded. The bottom end 107 intersects the rear end 97 of the platform 95. This intersection is also preferably beveled or rounded. The forward surface 105 is preferably about one and three-quarters (1¾) inches tall.

The terminal end 110 of the wall 100 is located about a platform width $W_p$ from the end 84 of the block 80. The terminal end 110 has a surface 111 that is generally planar and rectangular in shape, and has a top end, a bottom end, a side edge and side end 112. The side edge and side end 112 are parallel, and perpendicular to the top and bottom ends. The side end 112 of the terminal end 110 intersects the side end 108 of the forward surface 105 of the wall 100. This intersection is preferably beveled or rounded. The three parallel grooves 109 turn at the side end 108 of the forward surface 105 and extend across surface 111 of the terminal end 110 in the same evenly and uniformly spaced manner as they did across surface 105 until they meet the rear surface 102 of the wall 100.

One side end 84 of the block 80 has a generally planar and rectangular shaped surface 114. The other side end 85 has a generally planar and L-shaped surface 115. End surfaces 114 has an upper end and a lower edge, and a front end and a rear edge that define the outer margins of one side face of the block 80. The side portion 95a of the platform 95 has a side end that intersects the upper end of the end surface 114. The side portion 95a has a rear edge that intersects the rear surface 102 of the block 80. The side portion 95a also End surfaces 115 has opposed upper and lower edges, and opposed front and rear edges that define the outer margins of the other side face of the block 80. The end surfaces 114 and 115 are substantially parallel to the surface 111 of the terminal end 110 of the wall 100. The front and rear ends or edges of each surface 114 and 115 are substantially parallel, and substantially perpendicular to the upper and lower ends or edges. The end surfaces 114 and 115 are generally perpendicular to the rearward and forward surfaces 102 and 105 of the wall 100, as well as the bottom and front surfaces 92 and 94 of the base 90. The dowel holes 93 and 103 extend to and form an opening in the end surface 115 of the block 80. Forward surface 105 is perpendicular to the end surface 115, and the top surface 104.

The outside corner block 80 has been shown and described with its wall 100 on a particular side. However, it should be understood that a corner block 120 can be manufactured having its wall 100 on the opposite side as shown in FIG. 1. Blocks 80 and 120 are effectively mirror images of each other. For the sake of clarity, we can designate block 80 as a right hand outside corner block, and block 120 as a left hand outside corner block. Right hand block 80 is used to make right hand turns in the border configuration 20 when looking at the block from end 85. Left hand block 120 is used to make left hand turns in the border configuration 20 when looking at the block from end 85. The blocks 80 and 120 and their component parts are otherwise similar in size, shape and orientation. The block width W remains about four and a half (4½) inches, the height H remains about three and a half (3½) inches, the base thickness and the wall thickness each remain about one and three quarters (1¾) inches and the platform width $W_p$ remains about two and three quarters (2¾) inches.

Figure 17:
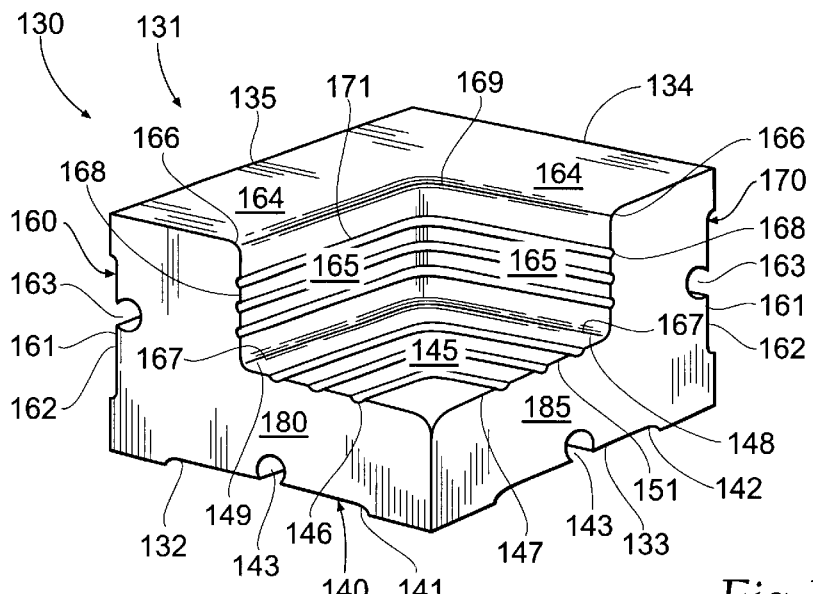
FIG. 17 is a perspective view of an inside cornering block for forming an inside corner in the present multi-grade lawn edging block assembly.
Figure 18:
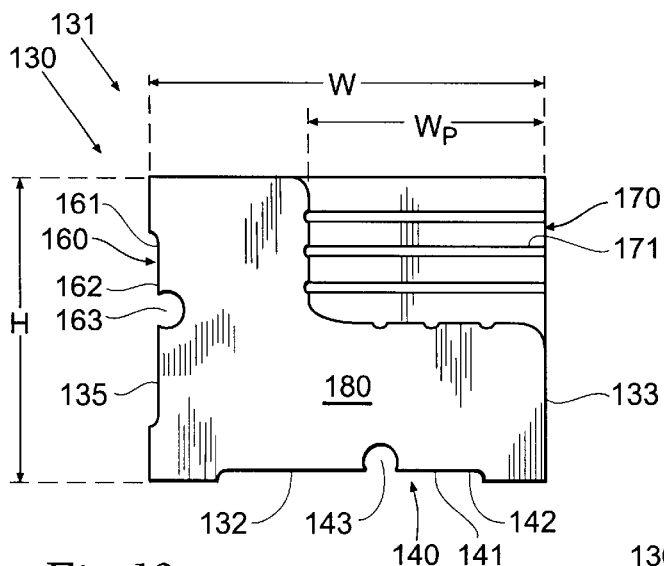
FIG. 18 is a side view of the inside cornering block.
Figure 19:
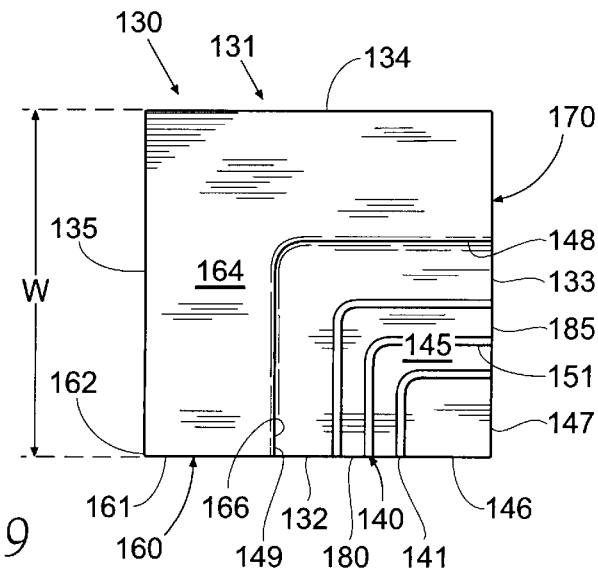
FIG. 19 is a top view of the inside cornering block.

Each of the inside corner blocks 130 has the shape shown in FIGS. 17–19. Each corner block 130 is preferably made of masonry or concrete. Each block 130 has a main body 131 with first and second side ends 132 and 133. The block 130 has first and second rear ends 134 and 135. The distance between each side end 132 or 133 and its opposed rear end 134 or 135, defines the width W of each side end of the block 130. Each side end has the same width W, which is preferably about four and a half (4½) inches. The block 130 has an upper end and an opposed lower end. The distance between the upper most portion of its upper end and its lower end defines the height H of the block 130, which is preferably about three and a half (3½) inches.

The inside corner block 130 has a base 140 with an outwardly extending portion 141 located proximal side ends 132 and 133. The outwardly extending portion 141 has a bottom surface 142 and an upper surface or platform 145. The bottom surface 142 is generally planar and square in shape, and has adjacent side edges and adjacent rear edges that define its outer margins or the footprint of the block 130. The bottom surface 142 and platform 145 are spaced apart by a distance or base thickness of about 1 and three quarters (1¾) inch. Each side edge is substantially parallel to its opposed rear edge. Adjacent edges are perpendicular. The bottom surface 142 is substantially flat, but includes a ledge or ridge proximal to and traversing its rear edges that extend slightly down about ⅛ inch from the major portion of the bottom surface. Each ledge is about ¾ inch wide and forms a step or abutment. One hole or opening 143 is formed into the bottom surface 142 proximal each side edge. The opening is adapted to receive a portion of a cylindrical shaped dowel as discussed below. The dowel openings 143 are preferably quasi-circular or horseshoe shaped with a diameter adapted to snuggly and securely receive the dowel.

The upwardly facing platform 145 of the base 140 is generally planar and square shaped. The platform 145 has adjacent side edges 146 and 147, and rear ends 148 and 149. The side edge 146 or 147 is substantially parallel to and spaced from its opposed rear end 148 or 149 a distance or platform width $W_p$ of about two and three quarters (2¾) inches. The adjacent side edge 146 and 147 substantially perpendicular, as are adjacent rear ends 148 and 149. Three parallel grooves 151 extend across the platform 145 from one side edge 146 to an intermediate location where they take a ninety degree turn and extend to the other side end 147. The grooves 149 are evenly and uniformly space apart as in blocks 30 and 80. The platform 145 is generally parallel to the bottom surface 142.

The inside corner block has first and second intersecting walls 160 and 170. Each wall 160 and 170 has an upwardly extending portion 161 that extends along one end 134 or 135. Each upwardly extending portion 161 has a rearward surface 162, a top surface 164 and a forward surface 165. The rearward 162 and forward 165 surfaces are spaced apart a distance or wall thickness of about one and three quarters (1¾) inches. Each rearward surface 162 is generally planar, and has upper and lower edges and opposed side edges that define its outer margins or one of the rear faces of the block 130. The side edges are substantially parallel. The upper and lower edges are substantially parallel, and perpendicular to the side edges. Each rearward surface 162 is substantially flat, but includes a pair of ledges or ridges proximal to and traversing the upper and lower edges that extend slightly down about ⅛ inch from the major portion of the bottom surface. Each ledge is about ¾ inch wide and forms a step or abutment in the rearward surface 162. One hole or opening 163 is formed into each rearward surface 162 proximal one side edge. The opening is adapted to receive a portion of a cylindrical shaped dowel as discussed below. The dowel opening 163 is preferably quasi-circular or horseshoe shaped with a diameter adapted to snuggly and securely receive the dowel. The lower edge of each rearward surface 162 intersects one of the rear ends of the bottom surface 142 to form one of the lower rear corners of the block 130.

The top surface 164 of each upwardly extending portion 161 of the wall 160 has a side edge, a front end and a rear edge. The side edges are substantially parallel. The front end and rear edge are substantially parallel, and substantially perpendicular to the side edges. The top surface 164 is preferably generally perpendicular to each rearward surface 162, and preferably generally parallel to the bottom surface 142 and the platform 145 of the base 140. The rear end intersects the upper end of its corresponding rearward surface 162 to form the upper rear corners of the block 130.

The forward surface 165 of each wall 160 and 170 is generally planar and square in shape, and has a top end 166, a bottom end 167, a side edge 168 and side end 169 that defining its outer margins or the front face of the block 130. The top and bottom ends 166 and 167 are parallel. The side edge 168 and side end 169 are parallel, and perpendicular to the top and bottom ends 166 and 167. Three parallel grooves 171 extend across each forward surface 165 from the side edge 168 to the side end 171. The grooves 171 are evenly and uniformly space apart as in the forward surfaces 65 and 105 of blocks 30 and 80. Each forward surface 165 is parallel to and spaced from its corresponding rearward surface 162 a distance or wall thickness of about one and three-quarters (1¾) inches. The top end 166 intersects the front end of the top surface 164. This intersection is preferably beveled or rounded. The bottom end 167 intersects the rear end 147 of the platform 145. This intersection is also preferably beveled or rounded.

The side ends 132 and 133 of the inside corner block 130 have generally planar and L-shaped surfaces 180 and 185, respectively. Each end surface 180 and 1855 has opposed upper and lower edges, and opposed front and rear edges that define the outer margins or one side face of the block 130. The end surfaces 180 and 185 are substantially perpendicular. The front and rear ends are substantially parallel, and substantially perpendicular to the upper and lower ends. Each end surface 180 and 185 is generally perpendicular to its adjacent rearward surface 162, as well as the bottom surfaces 142. The dowel holes 143 and 163 extend to and form an opening in the end surfaces 180 and 185 of the block 130. Each forward surface 165 is perpendicular to its adjacent end surface 180 or 185, and the top surface 164. The side edge 168 of the front surface 165 of each wall 160 intersects an intermediate vertical edge of its adjacent side surface 180 or 185.

Although the arrangement of a plurality of like-shaped straight blocks 30, like-shaped outside corner blocks 80 and 120, and like-shaped inside corner blocks 130 to form any number of lawn edging block assemblies 21–25 should be readily understood based on the above description, the following is provided to further assist the reader. First, a trench 202 is dug into the ground in the desired border configuration 20. Sand or gravel 205 can be placed in the trench 202 to form a bed at a desired level below the ground elevation $E_1$ of the adjacent lawn area 6. The level of the bed is just deep enough that the platforms 45, 95 and 145 of the blocks 30, 80, 120 and 130 will be even with the ground level $E_1$ when placed in the trench.

Prior to placing a particular block 30, 80, 120 and 130 into the trench 202, two semi-compressible dowels 210 are fit into the dowel holes 43 and 63, or 93 and 103, or 143 and 163 at one end 35, 85, and 132 of the block. That block is then set in its desired place in the trench 202. An adjacent block in the border configuration 20 is then aligned with that block. Adjacent straight blocks 30 are aligned in and end-to-end alignment as best shown in FIG. 2a. The side end 35 of the one straight block 30 is brought into abutting engagement with the end 34 of its adjacent straight block. The bottom 42, front 44, platform 45, rear 62, top 64 and forward 65 surfaces of each adjacent block 30 are brought into a flush, substantially parallel alignment with the corresponding surfaces of its adjacent block. The dowels 210 are then fit into the dowel holes of the adjacent block. This end-to-end alignment is repeated for additional adjacent blocks 30 until the entire straight segment 27 has been formed.

The outside corners 28 are formed by bringing one of the outside cornering blocks 80 or 120 into an end-to-end alignment 220 with the last straight block 30 in that straight segment 27 as shown in FIG. 1. The side end 85 of the outside corner block 80 or 120 is brought into abutting engagement with the end 34 of its adjacent straight block 30. The corresponding bottom 42 and 92, front 44 and 94, platforms 45 and 95, rear 62 and 102, top 64 and 104, and forward 65 and 105 surfaces are brought into the flush, substantially parallel alignment. The dowels 210 extending from the adjacent straight block 30 are then fit into the dowel holes of the adjacent outside corner block 80 or 120.

The outside corner 28 is completed by aligning a straight block 30 in an end-to-rear alignment 222 with the corner block 80 or 120. The side end 35 of the straight block 30 is brought into abutting engagement with the rear 102 of the right corner block 80. Similarly, for the left hand corner block 120, the side end 34 of the straight block 30 is brought into abutting engagement with the rear surface 102. The corresponding bottom 42 and 92, and top 64 and 104 surfaces are brought into substantially parallel alignment. The front surface 44 of the straight block 30 is brought into flush, substantially parallel alignment with the side end 98 of the corner block 80 or 120. The forward surface 65 of the straight block 30 is brought into flush, substantially parallel alignment with the terminal end 110 of the corner block 80 or 120. The platform 45 of the straight block 30 is brought into flush substantially parallel alignment with the side portion 95a of the platform 95 of the corner block 80 or 120. The front end 46 of the platform 45 of the straight block 30 is in substantially linear alignment with the side end 98 of the platform 95 of the corner block 80. Dowels are not used to connect the straight block 30 to its corner block 80 or 120 in this end-to-rear alignment 222 because no dowel holes are provided on the rear surface 102 of the corner block 80 or 120. Another straight segment 27 is then formed in the same manner as discussed above.

The inside corners 29 are formed by bringing the last straight block 30 in a straight segment 27 into an end-to-side end alignment 224 with an inside corner block 130. One side end 132 or 133 of the inside corner block 80 or 120 is brought into abutting engagement with the end 34 of its adjacent straight block 30. The platforms 45 and 145 and forward wall surfaces 65 and 165 of these adjacent blocks 30 and 130 are brought into substantially parallel alignment. The dowels 210 extending from the adjacent straight block 30 are then fit into the dowel holes of the adjacent inside corner block 130. The inside corner 29 is completed by aligning the side end 35 of another straight block 30 in a similar end-to-side end alignment 224 with that inside corner block 130. The platforms 45 and 145 and forward wall surfaces 65 and 165 of the two straight blocks 30 and the corner block 130 are all in substantially parallel alignment. Straight blocks 30 and corner blocks 80, 120 and 130 continue to be aligned and joined in this manner until the entire border configuration 20 is complete.

The flush or substantially parallel alignment of the platform surfaces 45, 95 and 145 of the various blocks forming the border configuration 20 creates a continuous deck 230 that extends completely around or the full length of the border configuration 20. The wheels on one side of a lawnmower (not shown) are able to smoothly travel in a linear path across the straight segments 27 of this deck 230 so that the grass along or adjacent the border is cut to the desired height of the surrounding lawn 7. The lawnmower is able to mow the lawn 7 adjacent the corners 28 and 29 of the border 20 in this same even manner. The lawnmower will simply have to end a cutting pass at the inside corners 29. The substantially parallel or flush alignment of the top 64 and forward 65 surfaces of the various blocks forming the border configuration 20 creates a continuous wall 235 that extends completely around or the full length of the border configuration 20.

Each like shaped straight block 30 has been shown and describes as having height H and width W dimensions of about three and a half (3½) and four and a half (4½) inches, respectively, as shown in FIGS. 1, 2a and 4–9. Yet, it should be understood that each block 30 is adapted to be rotated 90 degrees about its longitudinal axis so that its height H and width W are reversed, as shown in FIG. 2b. When rotated or reversed, the base 40 becomes the wall 60 and the wall becomes the base, so that the rotated block 30 has height H and width W dimensions of about four and a half (4½) and three and a half (3½) inches, respectively. The horizontal bottom 42 and platform 45 surfaces become its vertical rearward 62 and forward 65 surfaces, respectively. Similarly, the vertical rearward 62 and forward 65 surfaces become its horizontal bottom 42 and platform 45 surfaces, respectively.

Rotating the block 30 changes the orientation of the cross-sectional shape of the block. The rotated block 30 is taller and has a smaller width and footprint. This rotated block 30 remains stable during use when the ground elevation $E_2$ of the adjacent area is increased to ground elevation $E_3$. The thicknesses of the base 40 and wall 60 remain the same since they are both about one and three quarters (1¾) inches thick. Although the platform width is reduced to about one and three quarters (1¾) inches, this reduced width is sufficient to allow conventional lawnmowers to cut the grass immediately adjacent the block 30. When rotated, the decorative grooves 69 on the forward surface 65, become the traction grooves 49 on the platform 45. Similarly, the traction grooves 49 become the decorative grooves 69.

When assembling the like-shaped straight blocks 30 to form a border configuration 20, each block is rotated to a similar orientation so that adjacent blocks are abutted and flushly aligned in substantially the same end-to-end alignment 220 and connected by dowels 210 in the same manner as described above. Again, the straight segments 27 of the border assembly 20 form a continuous base 40 and wall 60 where adjacent blocks have parallel or flushly aligned bottom 42, front 44, platform 45, rear 62, top 64 and forward 65 surfaces. When combined with complimentary corner blocks similar to blocks 80, 120 and 130, the border assembly 20 forms a continuous deck 230 that extends completely around or the length of the border configuration 20. The wheels on one side of a lawnmower are able to smoothly travel in a linear path across the straight segments 27 of this deck 230 so that the grass along or adjacent the border is cut to the desired height of the surrounding lawn 7. The blocks also form a continuous wall 235 that retains the raised area 8 to elevation $E_3$, which can be as high as the height H of the blocks.

Figure 20:
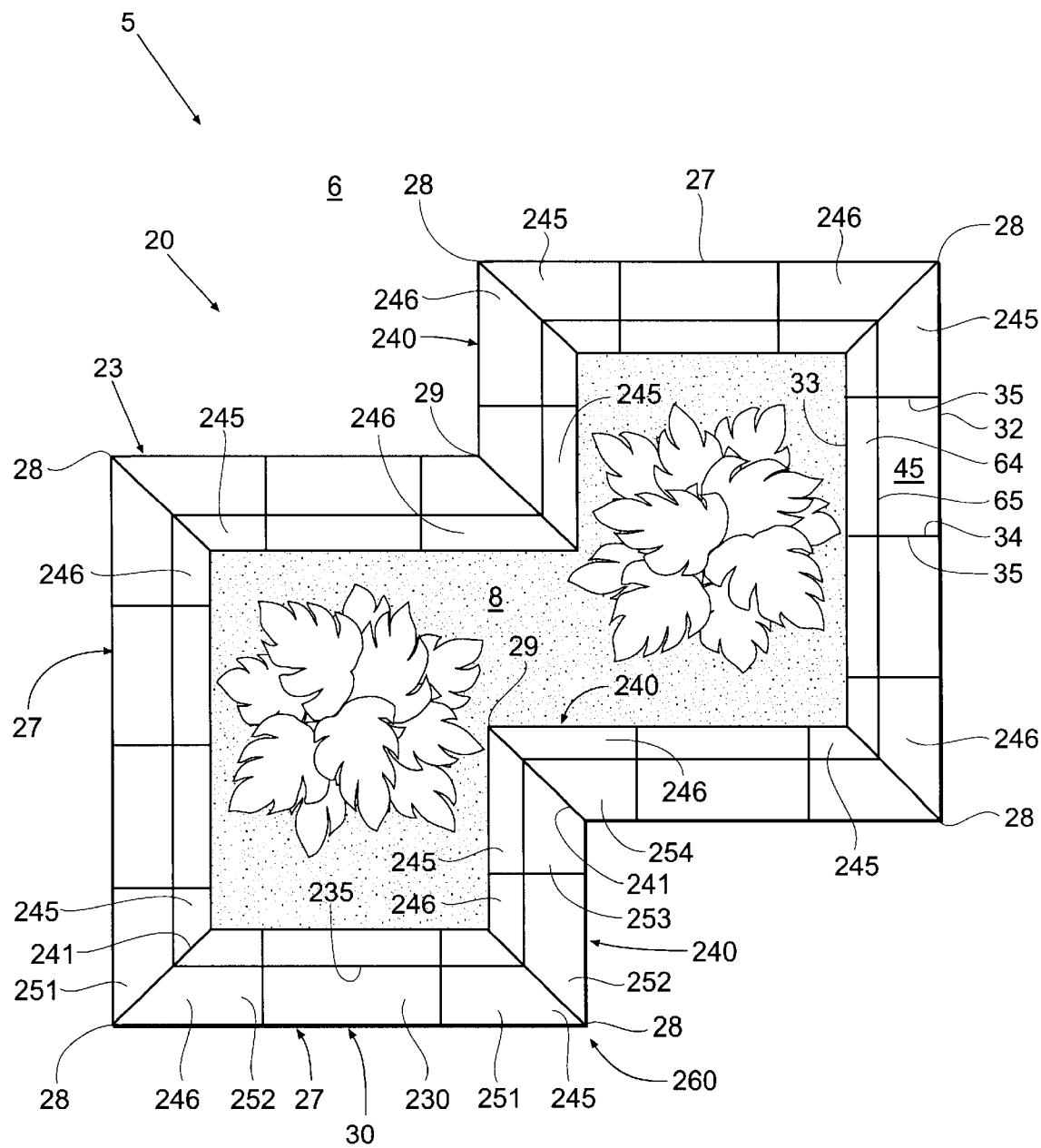
FIG. 20 is a plan view of a masonry lawn edging block assembly formed from several like-shaped straight blocks, where the ends of some of the straight blocks have been cut at a 45 degree angle to form the inside and outside corners of the border configuration.

The border configurations 20–25 have been shown and described as being comprised of straight blocks and at least one type of corner block 80, 120 or 130, as shown in FIGS. 1 and 3a–d. An additional embodiment of the present multi-grade lawn edging block assembly invention contemplates forming these and other border configurations 20 using only a plurality of the like-shaped straight blocks 30. No corner blocks are required. In this embodiment, one or both side ends 34 or 35 of some straight blocks 30 are cut or mitered to form a mitered block 240 having a mitered end 241 with a mitered end surface, as shown in FIG. 20. The right end 245 and left end 246 of each straight segment 27 is formed by one of the mitered blocks 240.

The mitered end blocks 240 are typically cut to form one of four types of mitered blocks 240. Where two adjacent straight segments 27 come together to form one of the outside corners 28 of the configuration 20, the right end block 245 of one straight segment 27 is a rear-right mitered block 251 and the left end block 246 of the adjoining segment 27 is a rear-left mitered block 252. The rear-right mitered block 251 is cut to remove the rear-right corner of the block 30. The mitered end 241 starts at the right corner on the front surface of the platform 40 of the block 251 and angles back toward the rear surface 62 of the wall 60. The rear-left metered block 252 is cut to remove the rear-left corner of the block 30. The mitered surface 241 starts at the left corner on the front surface of the platform 40 of the block 252 and angles back toward the rear surface 62 of the wall 60.

The mitered end blocks 240 of two adjacent linear segments 27 come together in a mitered end-to-mitered end alignment 260 to form a corner having a desired angle. The mitered ends 241 of adjacent mitered blocks 240 are cut to the same angle to achieve a flush alignment of the mitered ends. The mitered end 241 are cut at a forty-five (45) degree angle relative to the front and rear ends 32 and 33 of the block 30 to achieve a corner forming a 90 degree angle. The surface of each mitered end 241 is perpendicular to the bottom surface 42 and platform 45 of the base 40 of the block 30. The mitered end 241 of the one mitered block 240 is brought into abutting engagement with the mitered end 241 of its adjacent mitered end block. The horizontal bottom 42, platform 45, and top 64 surfaces of each adjacent mitered end block 240 are brought into flush, substantially parallel alignment with the corresponding surfaces of its adjacent mitered end block. The vertical front 44, rear 62 and forward 65 surfaces of each adjacent mitered end block 240 are brought into a flush, angled alignment with the corresponding surfaces of its adjacent mitered end block. The dowels 210 are not used to join the adjacent blocks 240.

Where two adjacent straight segments 27 come together to form one of the inside corners 29 of the configuration 20, the right end block 245 of one straight segment 27 is a front-right mitered block 253 and the left end block 246 of the adjoining segment 27 is a front-left mitered block 254. The front-right metered block 253 is cut to remove the front-right corner of the block 30. The mitered end 241 has a surface that starts at the right corner on the rear surface 62 of the wall 60 of the block 253 and angles back toward the front surface of the platform 40. The front left metered block 254 is cut to remove the front-left corner of the block 30. The mitered end 241 has a surface that starts at the rear surface 62 of the wall 60 and angles back toward the front surface of the platform 40.

The reversible feature of the block 30 is maintained when the border configuration 20 is formed of only the plurality of like-shaped straight blocks. As discussed above, each of the blocks is rotated so that its base 40 becomes the wall 60 and visa versa. The raised area 8 retained by the continuous wall 235 formed by the blocks 30 and 240 can be maintained at ground elevation $E_3$.

The reversibility of the block 30 has an economical advantage. A landscape setting may initially require the raised area 8 to have ground elevation $E_2$. New soil, mulch or fertilizing materials are frequently added to the raised area 8, which may be a flower or vegetable garden or a hedge line or group of shrubs. Over time, the ground level $E_2$ will rise and spill over the top 64 of the blocks 30. The reversible aspect of the block 30 allows them to be rotated to increase the height H of the block 30 and border configuration 20. Only the mitered blocks 240 need be replaced to achieve the increase in height H so that the border configuration 20 can now retain the raised area 8 up to a ground elevation $E_3$. Only the corner blocks 80, 120, 130 or 240 need to be replaced.

While the invention has been described with reference to preferred embodiments, it should be understood by those skilled in the art that various changes may be made and equivalents may be substituted without departing from the broad aspects of the block invention.

I claim:
1. A masonry lawn edging block assembly for forming a mowable border along a multi-grade landscape setting having a specific configuration and including a lawn area and an adjacent raised area, the lawn area having a first ground elevation and being mowable by a lawn mowing implement, the adjacent raised area having a second ground elevation, the second ground elevation being higher than the first ground elevation, the modular masonry lawn edging block assembly comprising:
  a plurality of like-shaped straight blocks, each of said straight blocks having front and rear ends that define its block width and opposed longitudinal ends that define its block length, each of said blocks having a base with an outwardly extending portion and a wall with an upwardly extending portion, said base having an upper platform and a front surface, said front surface being adapted to abut the lawn area, and said platform having a predetermined platform width and a front end adapted to be substantially even with the first ground elevation, said wall having forward and rearward surfaces and a top end, said forward surface being spaced a predetermined wall thickness from said rearward surface, said rearward surface being adapted to abut the raised area, said top end being adapted to be one of either above and substantially even with the second ground elevation, and said platform and wall extending said length of said block;
  a plurality of like-shaped corner blocks, each of said corner blocks having front and rear ends that define its block width and opposed longitudinal ends that define its block length, each of said blocks having a base with an outwardly extending portion and a wall with an upwardly extending portion, said base having an upper platform and a front surface, said front surface being adapted to abut the lawn area, and said platform having said predetermined platform width and a front end adapted to be substantially even with the first ground elevation, said wall having forward and rearward surfaces and a top end, said forward surface being spaced said predetermined wall thickness from said rearward surface, said rearward surface being adapted to abut the raised area, said top end being adapted to be one of either above and substantially even with the second ground elevation, said wall extending from said one end of said block to a terminal end spaced substantially one platform width from said other end of said block, said platform extending said length of said block and including a side portion traversing said block width from said terminal end of said wall to said other end of said block;
  wherein said straight and corner blocks have substantially equal block widths, block lengths, platform widths and wall thicknesses, adjacent straight blocks aligning in an end-to-end alignment to form linear segments, each linear segment having a desired length, each of said corner blocks aligning in an end-to-end alignment with a first adjacent straight block and in an end-to-rear alignment with a second adjacent straight block to form a corner at a desired location, said linear segments and corner being located to accommodate the specific configuration of the multi-grade landscape setting, wherein said walls of said straight and corner blocks combine to form a continuous wall adapted to maintain the raised area at the second ground elevation, and wherein said platforms of said straight and corner blocks combine to form a continuous deck adapted to support the lawn mowing implement and allowing it to smoothly travel from one block to another and to smoothly travel from the first ground elevation onto said deck.

2. The masonry lawn edging block assembly of claim 1, and further comprising a plurality of like-shaped inside cornering blocks, each of said cornering blocks having adjacent first and second side ends and adjacent first and second rear ends, said cornering block having a substantially square shape with each of its side ends having a width substantially equal to said block width of said straight blocks, each of said blocks having a base with an outwardly extending portion and first and second walls with upwardly extending portions, said base having an upper platform with first and second end surfaces, each of said end surfaces aligning with one of said longitudinal ends of an adjacent straight block in an end-to-side end alignment, said platform having said predetermined platform width, and each of said first and second walls having forward and rearward surfaces and a top end, said forward surface being spaced said predetermined wall thickness from said rearward surface, said rearward surface being adapted to abut the raised area, said top end being adapted to be one of either above and substantially even with the second ground elevation, said walls being adapted to maintain the second ground elevation, and said first wall extending said entire block width along said first rear end and, and said second wall extending said entire block width along said second rear end.

3. The masonry lawn edging block assembly of claim 1, and wherein each of said straight and corner blocks has an L-shaped cross section.

4. The masonry lawn edging block assembly of claim 3, and wherein said L-shaped cross section remains substantially constant for each of said straight blocks from one end of said straight block to said other end of said straight block, and wherein said L-shaped cross section remains substantially constant for each of said corner blocks from one end of said corner block to said terminal end of its said wall.

5. The masonry lawn edging block assembly of claim 1, and wherein the lawn area has a lawn that is mowable to a desired substantially even height, and each of said straight and corner blocks is adapted to align its said platform in a substantially planar alignment with the first ground elevation to enable the lawn mowing implement to mow the lawn to the desired substantially even height along the border.

6. The masonry lawn edging block assembly of claim 1, and wherein said platform extends from said forward surface of said wall to said front end of said block.

7. The masonry lawn edging block assembly of claim 6, and wherein said base has a bottom surface that forms a footprint of said block, and wherein said footprint of each of said straight and corner blocks is substantially equal.

8. The masonry lawn edging block assembly of claim 1, and wherein said forward surface of said wall is substantially parallel to said rearward surface of said wall, said rearward surface is substantially perpendicular to said bottom surface of said base, and said bottom surface is substantially parallel to said platform.

9. The masonry lawn edging block assembly of claim 1, and wherein said adjacent blocks are joined together by a pair of flexible dowels.

10. The masonry lawn edging block assembly of claim 7, and wherein said forward surface of said wall and said platform of said base of each of said straight blocks have uniformly spaced grooves extending from one of said longitudinal ends to said other longitudinal end of said block.

* * * * *